US007996901B2

United States Patent
O'Sullivan et al.

(10) Patent No.: US 7,996,901 B2
(45) Date of Patent: Aug. 9, 2011

(54) HYPERVISOR AREA FOR EMAIL VIRUS TESTING

(75) Inventors: Frances K. O'Sullivan, Raleigh, NC (US); Richard W. Cheston, Morrisville, NC (US); Daryl Cromer, Cary, NC (US); Robert S. Gamble, Cary, NC (US); Howard J. Locker, Cary, NC (US); Rod D. Walterman, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1004 days.

(21) Appl. No.: 11/394,657

(22) Filed: Mar. 31, 2006

(65) Prior Publication Data

US 2007/0240216 A1 Oct. 11, 2007

(51) Int. Cl.
*G06F 11/00* (2006.01)
(52) U.S. Cl. ............... 726/24; 726/22; 726/23; 726/25; 726/26; 726/27; 726/2; 726/3; 713/2; 713/165; 713/167; 709/223; 709/224; 709/225
(58) Field of Classification Search ............ 726/22–27, 726/17, 2, 3; 713/182, 2, 165, 167; 707/9; 709/223–225
See application file for complete search history.

(56) References Cited

U.S. PATENT DOCUMENTS

| 5,452,455 A | * | 9/1995 | Brown et al. | 713/100 |
| 7,131,036 B2 | * | 10/2006 | Wray et al. | 714/38 |
| 2003/0131112 A1 | | 7/2003 | Yu | |
| 2004/0015672 A1 | | 1/2004 | Masse | |
| 2004/0111578 A1 | | 6/2004 | Goodman et al. | |
| 2006/0021029 A1 | * | 1/2006 | Brickell et al. | 726/22 |
| 2006/0161982 A1 | * | 7/2006 | Chari et al. | 726/23 |
| 2006/0185015 A1 | * | 8/2006 | Cheston et al. | 726/24 |
| 2006/0242702 A1 | * | 10/2006 | McIntosh et al. | 726/22 |
| 2007/0061898 A1 | * | 3/2007 | Yang et al. | 800/3 |
| 2007/0112772 A1 | * | 5/2007 | Morgan et al. | 707/9 |
| 2007/0113227 A1 | * | 5/2007 | Oney et al. | 718/1 |
| 2007/0136579 A1 | * | 6/2007 | Levy et al. | 713/168 |
| 2007/0143839 A1 | * | 6/2007 | Chen et al. | 726/17 |
| 2007/0233455 A1 | * | 10/2007 | Zimmer et al. | 703/27 |

* cited by examiner

*Primary Examiner* — Jacob Lipman
*Assistant Examiner* — Tongoc Tran
(74) *Attorney, Agent, or Firm* — Ference & Associates, LLC

(57) ABSTRACT

Hypervisors are a new technology in the industry that enable multiple Operating Systems to co-exist on a single client. The use of a hypervisor provides a novel approach to email virus protection. The hypervisor is able to fire up an Operating System on demand, for a specific purpose, or have it running from the powering of the computer. A second Operating System can be provided as a donor Operating System that acts as a scratch area or scratch pad. Emails sent to the recipient are opened under the donor Operating System, or the "Scratch OS". Once the email activities are complete, the "Scratch OS" can be discarded. Thus, any damage that may be caused by an email virus would be nil, and further the User Operating System would be undamaged. This method would be effective in precluding any damage that a virus may have done.

17 Claims, 1 Drawing Sheet

Type I Hypervisor

HYPERVISOR AREA FOR EMAIL VIRUS TESTING

FIELD OF THE INVENTION

The present invention relates generally to a method that utilizes hypervisors to provide protection against email viruses.

BACKGROUND OF THE INVENTION

As the usage of computers becomes more widespread and the technology to produce them advances, so to does the amount of communication that is enabled by them. Although most of this communication is friendly, i.e., communication between known partners with information and attachments that is not intended to do harm to or between the communicators, some communication is unfriendly. This unfriendly communication occurs mostly in the form of email virus threats. These threats include, but are not limited to, social engineering threats and script based attacks.

Social engineering email viruses convince the recipient to perform some sort of action. For example, the email convinces the recipient to launch a program, or unzip a file that allows a virus to cause harm to the recipient's computer. Script based attacks involve emails that contain embedded script, for example, but not limited to, Visual Basic Script, JavaScript, and so forth. This script executes and infects the system at different points of communication. The infection can occur when the email is viewed, or in some cases when the email is received by the recipient. Viruses are able to cause many types of harm, including but not limited to, data destruction, password capture, user activity monitoring, and so forth. The implications of these types of harms are well-known.

Protection against email viruses exists in the form of anti-virus tools, but these tools only offer protection against viruses that are known to them. Thus, if a new virus is encountered, or the recipient does not have up-to-date virus protection, the virus is able to cause extensive, and sometimes irreparable, damage to the recipient's computer.

Thus, there exists a need in the art for a method or system which is able to provide a more comprehensive email virus protection. Such a method or system would ensure that even unknown viruses would not have negative effects on the recipient's computer.

SUMMARY OF THE INVENTION

This present invention relates to a method for using hypervisors to provide email virus protection. Hypervisors are a new technology in the industry that enable multiple Operating Systems to co-exist on a single client. Hypervisors allow different operating systems to run on the same hardware concurrently. This has many advantages including resource isolation and ability to concurrently run different operating systems and associated applications. There are two main types of hypervisors. Hypervisor Type 1 is when the hypervisor runs directly on the hardware. This allows good performance in each operating system vs. type 2 hypervisor where the hypervisor runs under an existing operating system.

In summary, one aspect of the invention provides a method comprising the steps of: receiving communication over a network using a computer with a first operating system and a hypervisor; recognizing that the communication is an email communication; creating a second operating system in the computer from the hypervisor; opening the email communication in the second operating system; and using the second operating system to validate whether the email communication contains a virus.

Another aspect of the invention provides a system comprising: a computer with a first operating system; a network; wherein the computer is connected to the network to enable communication using the first operating system; a hypervisor that is able to detect when the communication is an email communication; a second operating system that is created by the hypervisor upon opening of email communication; and a validator that uses the second operating system to validate whether the email communication contains a virus.

Furthermore, an additional aspect of the invention provides a program storage device readable by machine, tangibly embodying a program of instructions executable by the machine to perform method steps, said method comprising the steps of: receiving communication over a network using a computer with a first operating system and a hypervisor; recognizing that the communication is an email communication; creating a second operating system in the computer from the hypervisor; opening the email communication in the second operating system; and using the second operating system to validate whether the email communication contains a virus.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE PREFERRED EMBODIMENTS

Figure 1:
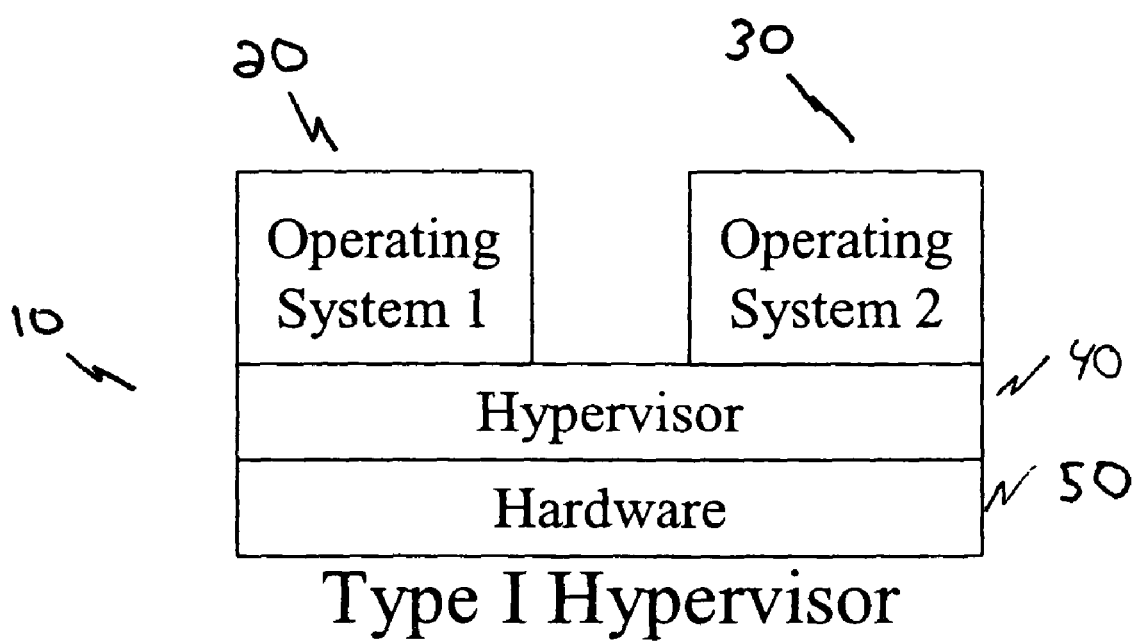
FIG. 1 illustrates an example of a Type 1 Hypervisor.

As mentioned above, the present invention relates to a method for using hypervisors to provide email virus protection. Hypervisors are a new technology in the industry that enable multiple Operating Systems to co-exist on a single client. Hypervisors allow different operating systems to run on the same hardware concurrently. This has many advantages including resource isolation and ability to concurrently run different operating systems and associated applications. There are two main types of hypervisors. A Type 1 Hypervisor runs directly on the hardware. Type 2 hypervisors run under an existing Operating System. Type 1 hypervisors allow good performance in each Operating System as opposed to Type 2 hypervisors. Examples of well-known hypervisors include VMWare and XEN. Additional information about these hypervisors may be found at www dot xensource dot com and www dot vmware dot com.

The instant invention utilizes a Type 1 Hypervisor in a novel way to provide email virus protection. This novel usage of a hypervisor will be detailed below in accordance with the co-existing Operating Systems. FIG. 1 details a Type 1 Hypervisor environment. Type 1 Hypervisor (item 10) environments are ideally suited for client manageability. The hypervisor abstracts both Operating Systems to the hard drive, with each Operating System able to be unaware of the other. When an Operating System writes to the hard drive, it is actually writing to a virtualized hard drive or virtual file drive. This driver writes to the hard drive as appropriate. The Operating Systems are unaware of the virtualized hard drive. Operating system 1 (item 20) can be the User Operating System (UOS) such as Microsoft XP. Operating System 2 (item 30) is a Service Operating System (SOS) used for client manageability such as Linux, or Microsoft Windows PE, or an additional UOS such as Microsoft XP. These two Operating Systems, and the hypervisor (item 40), run on the same hardware (item 50).

This ability to have two co-existing Operating System through the use of a hypervisor provides a novel approach to email virus protection. The hypervisor is able to fire up an Operating System on demand, for a specific purpose, or have it running from the powering of the computer. Further, more than one Operating System can be enabled from the hypervisor. A second Operating System can be provided as a donor Operating System that acts as a scratch area or scratch pad. Emails sent to the recipient are opened under the donor Operating System, or the "Scratch OS". Once the email activities are complete, the "Scratch OS" can be discarded. Thus, any damage that may be caused by an email virus would be nil, and further the User Operating System would be undamaged. This method would be effective in precluding any damage that a virus may have done.

By creating a "scratch OS" image that is validated and stored by a hypervisor application, email contamination can be reduced. The operating systems are not aware of the hypervisor. The hypervisor has a virtual file drive system that the OS writes to, which sits between the OS and the real hard drive. Even though it came from a email client, the file system in the hypervisor can put the file across into the "Scratch OS". If you are reading the file, the hypervisor is aware of the type of file being read and its pushed into the "Scratch OS". The hypervisor recognizes an email thread is running and thus pushes it into the "Scratch OS".

When a new email is received, the Hypervisor environment launches a copy of the "Scratch OS". This "Scratch OS" contains an antivirus tool, and the email client running under remote control from the User Operating System. The contents of the email are scanned for known viruses. If the scan is successful, the email is opened. The email is able to be opened under the "Scratch OS" by the user who is remotely controlling the "Scratch OS" email client, or by using an automated script. When the email has finished opening, a validation check is performed between the contents of the running "Scratch OS" and the image of the "Scratch OS" that was saved by the hypervisor application. If the check succeeds, and determines that no damage has been done to the "Scratch OS" the email is allowed to pass to the User Operating System. The recipient can then save the email, its attachments, process the email, and so forth. Additional attachments can be tested and validated in the same manner. This limits damage from new virus that are not understand by the anti-virus program to only the "Scratch OS".

Under remote control of the "Scratch OS", the user can extract the contents of the email. After the program is executed or the attachment extracted, a virus scan can be performed. If any activity is detected, the email is not allowed to pass to the User Operating System. Either the recipient, the User Operating System, or the "Scratch OS" itself can detect if any damage has been done. When all email activity is complete, the "Scratch OS" is purged from memory and none of the changes are recorded to disk. The "Scratch OS" can also be maintained to always be available when emails are viewed rather than being created on demand for such a purpose and then is only purged when the computer system is shut down.

It is to be understood that the present invention, in accordance with at least one presently preferred embodiment, includes elements which may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method comprising:
   receiving communication over a network at a computer with a first operating system;
   recognizing via a hypervisor of the computer that the communication is an email communication;
   responsive to recognizing via the hypervisor that the communication is an email communication, creating a second operating system via the hypervisor in the computer;
   saving an image of the second operating system upon creation;
   opening the email communication in the second operating system;
   comparing the second operating system to the saved image after the second operating system has opened the email communication; and
   validating whether the email communication contains a virus using the second operating system.

2. The method of claim 1, wherein the hypervisor is a Type 1 hypervisor.

3. The method of claim 1, wherein the second operating system contains antivirus tools.

4. The method of claim 1, wherein the virus may be a known or an unknown virus.

5. The method of claim 1, wherein the hypervisor enables the first operating system and the second operating system to run concurrently.

6. The method of claim 1, wherein the hypervisor abstracts the first and second operating systems to the underlying hardware by using a virtualized hard drive that communicates between the operating systems and the hard drive.

7. The method of claim 1, wherein using a computer with a first operating system and a hypervisor to perform acts further comprises destroying the second operating system when email communication has been completed.

8. A system comprising:
   a computer comprising a first operating system, a hypervisor, a second operating system, a comparator, an image saver, and a validator;
   wherein:
   the computer is connected to a network to enable communication using the first operating system;
   the hypervisor is able to detect when the communication is an email communication and push the email communication into the second operating system;
   the second operating system is created by the hypervisor;
   the image saver saves an image of the second operating system upon creation;

the comparator compares the second operating system to the image saved after the second operating system has opened the email communication; and the validator is configured to use the second operating system to validate whether the email communication contains a virus.

9. The system of claim 8, wherein the hypervisor is a Type 1 hypervisor.

10. The system of claim 8, wherein the second operating system contains antivirus tools.

11. The system of claim 8, wherein the virus may be a known virus or an unknown virus.

12. The system of claim 8, wherein the hypervisor enables the first operating system and the second operating system to run concurrently.

13. The system of claim 12, wherein the hypervisor abstracts the first and second operating systems to the underlying hardware by using a virtualized hard drive that communicates between the operating systems and the hard drive.

14. The system of claim 8, wherein the computer further comprises a destroyer which destroys the second operating system when email communication has been completed.

15. A program storage device readable by machine, tangibly embodying a program of instructions which when executed by the machine enable the machine to use a first operating system and a hypervisor of the machine to perform acts comprising:

receiving communication over a network;

recognizing via the hypervisor that the communication is an email communication;

responsive to recognizing via the hypervisor that the communication is an email communication, creating a second operating system in from the hypervisor;

saving an image of the second operating system upon creation;

opening the email communication in the second operating system;

comparing the second operating system to the saved image after the second operating system has opened the email communication; and validating whether the email communication contains a virus using the second operating system.

16. The method according to claim 3, further comprising:

scanning the email communication with at least one of the antivirus tools on the second operating system prior to opening the email communication on the second operating system.

17. The method according to claim 16, wherein the hypervisor recognizing that the communication is an email comprises the hypervisor determining that an email thread is running.

* * * * *